INVENTORS
ARTHUR KAISER, &
HENRY W. MAHLER
BY
Brumbaugh, Frey, Graves + Donohue
their ATTORNEYS March 10, 1970 A. KAISER ET AL 3,500,198
APPARATUS AND METHOD FOR MEASURING THE LOGARITHM
OF THE ROOT-MEAN-SQUARE VALUE OF A SIGNAL
Filed Dec. 2, 1966 2 Sheets-Sheet 2

INVENTORS
ARTHUR KAISER, &
HENRY W. MAHLER
BY
Brumbaugh, Free, Graves + Donohue
their ATTORNEYS United States Patent Office 3,500,198
Patented Mar. 10, 1970

3,500,198
APPARATUS AND METHOD FOR MEASURING THE LOGARITHM OF THE ROOT-MEAN-SQUARE VALUE OF A SIGNAL
Arthur Kaiser, Trumbull, and Henry W. Mahler, Newtown, Conn., assignors to Columbia Broadcasting System, Inc., New York, N.Y., a corporation of New York
Filed Dec. 2, 1966, Ser. No. 598,827
Int. Cl. G01r 15/10; G06g 7/24
U.S. Cl. 324—132                                    18 Claims

ABSTRACT OF THE DISCLOSURE

A signal measuring method and apparatus which generates a signal that is proportional to the logarithm of the root-mean-square value of the input signal to be measured by generating a signal proportional to the logarithm of the input signal, and then generating a signal proportional to the peak-to-peak value of the logarithmic signal.

---

This invention relates to a signal measuring method and apparatus and, more particularly, to a method and apparatus for measuring signals of a relatively wide dynamic range.

Measurements of electrical signals are made by measuring the average, root-mean-square, or peak-to-peak value of the signal. If the power level of the signal is the characteristic of interest, such as, for example, in the measurement or monitoring of audio waveforms being recorded, reproduced or broadcast, the root-mean-square, or effective, value of the signal is the most significant. The conventional rectifier-type voltmeter measures the average value of a signal, but such average reading meters are often calibrated for root-means-square (RMS) measurement of sine-wave voltages. This calibration is only valid for sine waves, and errors are introduced if such a voltmeter is used to measure a complex wave which is discontinuous or is of varying peak factor, for example. In addition, the ballistics of the meter movement affects the measurement of a complex waveform.

The conventional Volume Indicator, or VU meter, is an example of an average reading meter which is calibrated for root-mean-square values and has specified meter deflection characteristics in order to provide standard readings for complex waveforms. The conventional VU meter, however, measures only over a range of between +3 and −20 decibels relative to a predetermined reference level on any one scale setting and thus cannot be used for measurements of background noise level, crosstalk or program dynamic range while program material is being monitored. In addition, the making of measurements of program material or other electrical signal of wide dynamic range is extremely difficult due to the necessity of scale switching at the proper times.

Electrodynamometer instruments have also been used to measure the root-mean-square value of a complex waveform, but the use of such instruments is limited by the scale range as well as the frequency range of the instrument. Although logarithmic meter movements are known to the art, they are expensive and it would be very difficult to design such a movement having adequate range and accuracy. Furthermore, such a logarithmic meter movement would have to be driven by an amplifier which is linear over an extremely wide dynamic range if signals are to be measured over a range of 60 decibels, for example.

Accordingly, it is an object of the present invention to overcome the above-mentioned difficulties of conventional electrical signal measuring systems.

Another object of the invention is to provide a novel method and apparatus for measuring signals of a relatively wide dynamic range.

A further object of the invention is to provide an improved method and apparatus for generating an output signal that is proportional to the logarithm of the root-mean-square value of an input signal.

Still another object of the invention is to provide an improved method and apparatus for monitoring program material over a range between +3 and −57 decibels relative to a selectable reference level on a single linear decibel scale.

These and other objects and advantages of the invention are attained by generating a signal proportional to the logarithm of the signal to be measured, and generating a signal proportional to the peak-to-peak value of the signal generated by the logarithmic signal generator. More particularly, the logarithmic signal is generated by adjusting the instantaneous gain of an amplifier in response to the instantaneous magnitude of the output thereof by providing the amplifier with one of a plurality of different amounts of negative feedback, the amount of negative feedback being determined by the instantaneous magnitude of the amplifier output signal.

All of the above is more fully explained in the detailed description of a preferred form of the invention which follows, this description being illustrated by the accompanying drawings, wherein.

Figure 1:
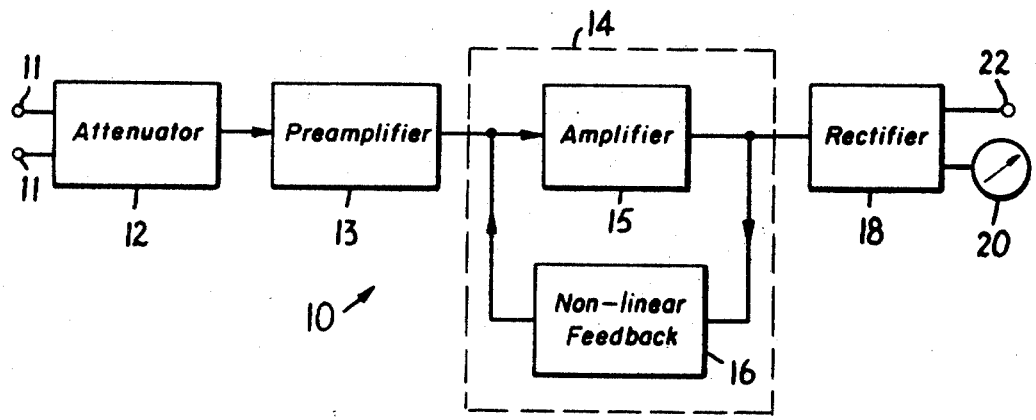
FIG. 1 is a diagrammatic illustration in block diagram of a typical apparatus for measuring electrical signals of a wide dynamic range embodying the present invention.

In the representative embodiment of the invention shown by way of example in the drawings, program material to be measured or monitored by the program monitor 10 is applied to a pair of input terminals 11 of a conventional attenuator 12, the input terminals 11 preferably being adapted to bridge a balanced or unbalanced program line by techniques which are well known to the art. A conventional preamplifier 13 is connected to the output of the attenuator 12, which includes a suitable conventional potentiometer to permit the selection of a zero decibel reference setting over a range of from +18 dbm. to −22 dbm., for example. The preamplifier 13 drives a olgarithmic device 14 which includes an amplifier 15 provided with a non-linear feedback network 16. The output of the logarithmic device 14 is coupled to a peak-to-peak rectifier 18 which drives a linear indicating meter 20 which is provided with a linear scale calibrated in decibels, for example. The rectifier 18 also has an output terminal 22, to which a linear deflection, chart recording instrument may be connected, if desired.

Figure 2:
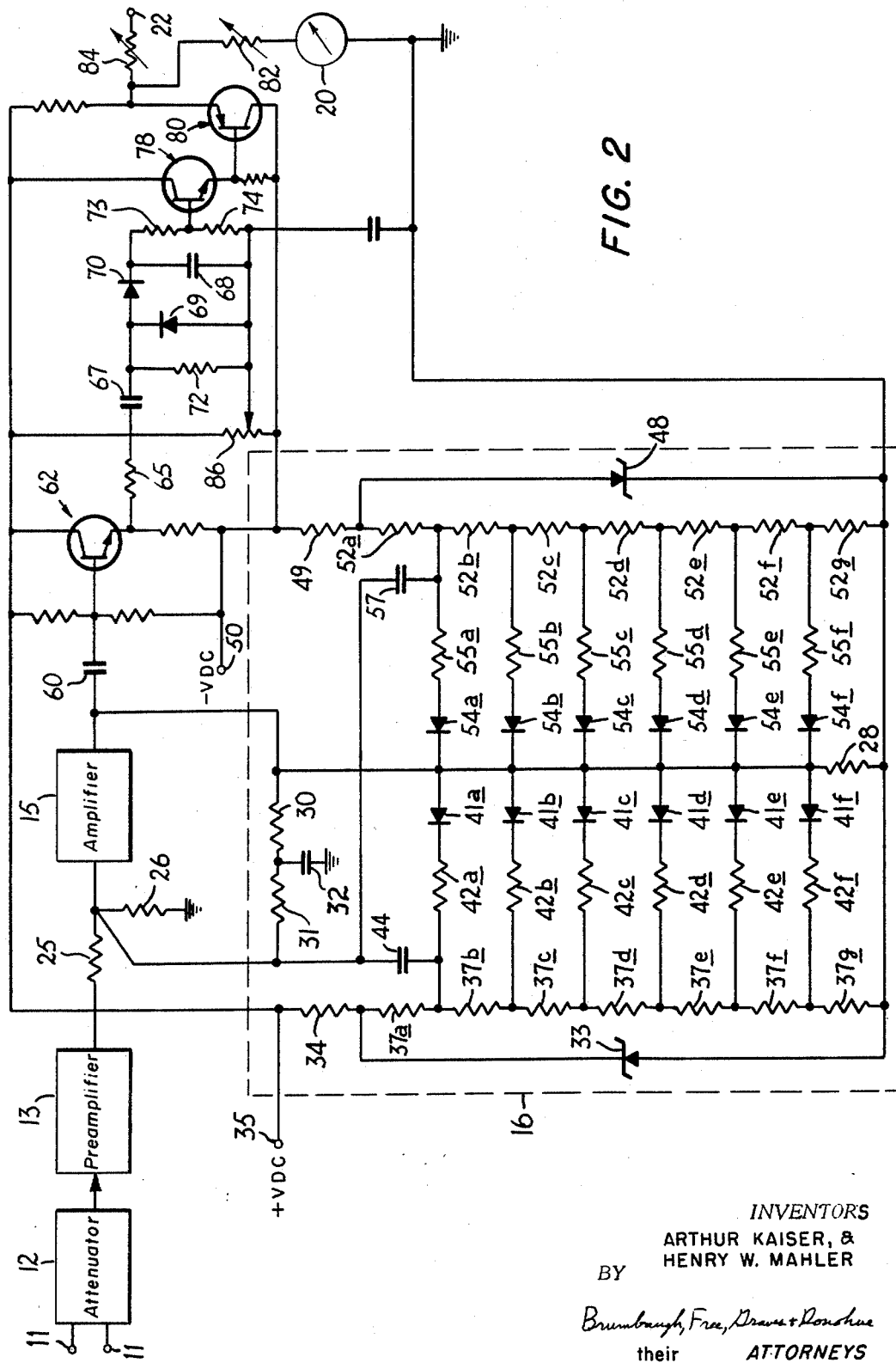
FIG. 2 is a schematic illustration of an electrical circuit, partially in block diagram, of the apparatus of FIG. 1.

Referring now to the schematic electrical diagram of FIG. 2, the output of the preamplifier 13 is developed across a pair of series-connected resistors 25 and 26, the input to the amplifier 15 appearing across the resistor 26. The output of the amplifier 15 is developed across a resistor 28 in the non-linear feedback network 16, and inasmuch as the amplifier 15 includes an odd number of conventional aplifying stages (not shown), a constant, relatively small amount of negative feedback is supplied through a pair of series-connected resistors 30 and 31 across the input resistor 26. In addition, one of a plurality of different amounts of additoinal negative feedback may be supplied by the remainder of the non-linear feedback network 16, the amount of feedback being determined by the instantaneous mangitude of the amplifier output signal across the resistor 28. In particular, the non-linear feedback network 16 includes a pair of negative feedback networks for coupling portions of the positive and negative excursions of the amplifier output signal to the input of the amplifier in response to the instantaneous magnitude of the positive and negative excursions, respectively, of the amplifier output signal.

The resistors 30 and 31 also act as a low pass filter together with a capacitor 32 which is connected between the common ends of the resistors 30 and 31 and ground. The low pass filter prevents parasitic oscillations which might result from extraneous signals of frequency beyond the frequency range for which the measuring apparatus is designed. This filter is desirable if the amplifier 15 is a high gain amplifier.

A conventional Zener diode 33 is energized through a resistor 34 from a suitable source of positive direct current voltage (not shown) connected to a terminal 35, to generate a plurality of positive reference voltage levels between adjacent ones of a plurality of series-connected resistors 37a–37g which are connected across the Zener diode 33. The instantaneous magnitude of the positive excursions of the output signal from the amplifier 15 is compared with the positive reference voltage levels by means of a plurality of diode-resistor pairs comprising the diodes 41a–41f and the resistors 42a–42f, each diode-resistor pair being connected between the output of the amplifier 15 and a different pair of adjacent ones of the resistors 37a–37g.

If a positive excursion of the output signal from the amplifier 15 is of sufficient magnitude, a portion thereof is coupled through one or more of the diode-resistor pairs 41a–42a . . . 41f–42f to the input of the amplifier by means of a coupling capacitor 44. For example, if the voltage across the resistor 28 is more positive than the positive reference voltage level at the connection between the resistors 37f and 37g but is less positive than the reference voltage level developed between the resistors 37e and 37f, only the diode 41f conducts and acts as a switch to provide an amount of negative feedback so long as the magnitude of the positive excursion exceeds the reference voltage level developed between the resistors 37f and 37g. In this situation the feedback resistance includes resistors 42f and 37b–37f, disregarding the feedback which is always provided through the resistors 30 and 31.

Similarly, a plurality of negative reference voltage levels are generated by a Zener diode 48 which is energized through a resistor 49 by a suitable source of negative direct current voltage (not shown) connected to a terminal 50, the negative reference voltage levels appearing between adjacent pairs of a plurality of series-connected resistors 52a–52g which are connected across the Zener diode 48. The magnitude of a negative excursion of the output signal from the amplifier 15 is compared with the negative reference voltage levels by means of a plurality of diode-resistor pairs 54a–55a . . . 54f–55f, each diode-resistor pair being connected between the output of the amplifier and a different pair of adjacent ones of the resistors 52a–52g.

If a negative excursion of the output signal of the amplifier 15 is of sufficient magnitude, a portion of the output signal is coupled through one or more of the diode-resistor pairs 54a–55a . . . 54f–55f to the input of the amplifier by means of a coupling capacitor 57. Thus, if the magnitude of a negative excursion of the amplifier output signal is more negative than the negative reference voltage level between the resistors 52f and 52g but is not as negative as the reference voltage level between the resistors 52e and 52f, the diode 54f conducts and acts as a switch to couple a portion of the negative excursion of the amplifier output signal through the resistors 55f and 52b–52f and the coupling capacitor 57 to the amplifier input.

The output of the amplifier 15 is also fed through a coupling capacitor 60 to a conventional emitter follower stage including the transistor 62, the output of which drives a voltage doubler or peak-to-peak rectifier through a resistor 65. The peak-to-peak rectifier includes a pair of capacitors 67 and 68, and a pair of diodes 69 and 70. As is well known, during an excursion of one polarity of an alternating current signal from the transistor 62, the capacitor 67 is charged through the diode 69, and during an excursion of the opposite polarity the capacitor 68 is charged through the diode 70 by the voltage stored on the capacitor 67 in addition to the signal supplied by the transistor 62, so that the peak-to-peak value of the signal from the transistor 62 is applied across the capacitor 68. The charging rate of the capacitors 67 and 68 is determined by the value of the resistor 65. The discharge rate of the capacitor 67 is determined by a resistor 72 connected across the diode 69, and the discharge rate of the capacitor 68 is determined by a pair of resistors 73 and 74 which are connected together in series across the acpacitor 68.

In addition to determining the discharge rate of the capacitor 68, the resistors 73 and 74 are a voltage divider which supplies a fraction of the output of the peak-to-peak rectifier to a conventional emiter follower stage inclduing a transistor 78, which in turn drives another emitter follower inclduing a transistor 80. The output of the transistor 80 is supplied through a variable resistor 82 to the indicating meter 20 and also through a variable resistor 84 to the terminal 22. The variable resistor 82 may be adjusted to provide the proper magnitude of current through the meter 20 to provide the desired full scale reading. Similarly, the variable resistor 84 adjusts the range of a chart recording meter which might be connected to the terminal 22, for example. The zero current reading of the meter 20 is adjusted by means of a potentiometer 86 which is connected between the sources of positive and negative direct current voltage at the terminals 35 and 50, respectively, the adjustable slide of the potentiometer 86 being connected to the base of the transistor 78 through the resistor 74.

In operation, the desired zero decibel reference setting for the meter 20 is obtained by means of the attenuator 12, and the program material to be measured or monitored applied at the input terminals 11 is amplified by the preamplifier 13, which dries the logarithmic amplifier 14. The output signal from the preamplifier 13 may vary from 0.01 to 10 volts, for example, corresponding to a dynamic range of 60 decibels, and the amplifier 15 may have a gain of 40 decibels, and yet the output of the amplifier 15 only varies from 1 to 10 volts because of the negative feedback provided by the non-linear network 16. A separate negative feedback network is provided for the positive and negative excursions of the output signal from the amplifier 15, so that the logarithmic amplifier 14 produces an output signal, the positive and negative excursions of which are proportional to the logarithm of the positive and negative excursions, respectively, of the output from the preamplifier 13.

The transfer function of the logarithmic device 14 is a broken line approximation by virtue of the operation of the diode-resistor pairs 41a–42a . . . 41f–42f and 54a–55a . . . 54f–55f in the non-linear feedback network 16. In particular, when the magnitude of a positive or negative excursion of the output signal from the amplifier 15 is less than the positive and negative reference voltage levels at the non-grounded ends of the resistors 37g and 52g, respectively, there is only the fixed, relatively small amount of negative feedback provided through the resistors 30 and 31 to the input of the amplifier 15.

As the magnitude of the positive and negative excursions of the amplifier output signal increases, additional ones of the diodes 41a–41f and 54a–54f become conductive, and so additional negative feedback is provided, and the reference voltage levels and the values of the resistors 37b–37f, 42a–42f, 52b–52f and 55a–55f are selected so as to achieve the desired logarithmic feedback function. It should be noted that the values of the forward resistances of the diodes 41a–41f and 54a–54f are negligible with respect to that of the other resistors in the feedback network, and so changes in the forward resistances due to temperature, for example, are negligible.

The output signal from the logarithmic device 14, the positive and negative excursions of which are proportional to the logarithm of the positive and negative excursions, respectively, of the program material applied to the input terminals 11, is applied to the peak-to-peak rectifier 18, which includes the capacitors 67 and 68 and the diodes 69 and 70. The rectifier 18 provides a rectified logarithmic signal across the resistors 73 and 74, which are preferably of the same value so that one-half of the rectified logarithmic signal drives the meter 20 through the transistors 78 and 80. Also, the values of the resistors 73 and 74 determine the discharge rate of the capacitor 68, as mentioned above.

The preferred values of the components of the peak-to-peak rectifier 18 if the illustrative apparatus of FIG. 2 is to be used for measuring or monitoring audio frequency program material for broadcast purposes, for example, are as follows:

| | | |
|---|---|---|
| Resistor 65 | ohms | 5.1K |
| Resistor 72 | do | 510K |
| Resistor 73 | do | 270K |
| Resistor 74 | do | 270K |
| Capacitor 67 | microfarads | 1.47 |
| Capacitor 68 | do | 0.47 |
| Diode 69 | | Type IN914 |
| Diode 70 | | Type IN914 |

For monitoring such audio frequency program material, the linear scale of the linear meter 20 is preferably calibrated in decibels, and the ballistics of the meter movement are controlled to provide readings compatible with those of the standard VU meter, thereby enabling correlation of measurements between the two instruments. Because of the compression effected by the logarithmic device 14, the meter 20 monitors or measures input signals on the terminals 11 over a dynamic range of 60 decibels, excluding the additional 40 decibel range provided by the attenuator 12, and so the meter 20 may be provided with a single scale calibrated from −57 decibels to +3 decibels. The rise time of the meter 20 in response to a signal is essentially controlled by the ballistics of the meter movement, while the fall time of the meter is essentially controlled by the discharge of the capacitor 68 through the resistors 73 and 74.

Thus, the apparatus 10 may be used to monitor or measure program material and provide readings over a range of from −20 decibels to +3 decibels which are compatible with a standard VU meter, while at the same time this apparatus can be employed to observe or measure noise level or crosstalk, for example, during the very brief program pauses that normally occur between sentences or even words. In addition, the apparatus 10 measures and monitors on a single linear decibel scale programs of wide dynamic range, such as the broadcasting or recording of symphony concerts, in which the program level often drops well below −20 decibels.

Figure 3:
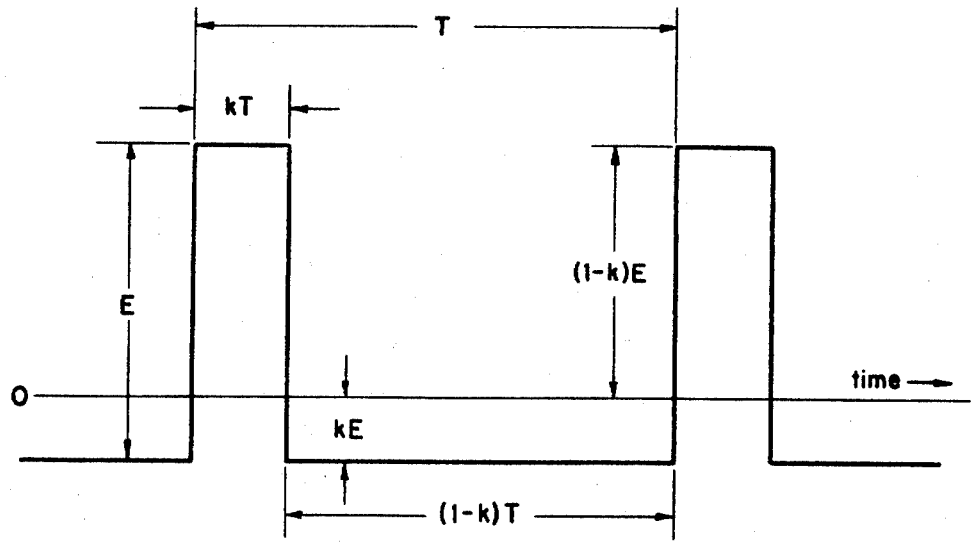
FIG. 3 is the waveform of an electrical signal which can be measured with the apparatus of FIG. 1.

The waveform of FIG. 3 represents a repetitive rectangular pulse train with zero direct current component. Therefore, the voltage-time integral of the negative portion of this signal equals that of the positive portion. If the repetition period is T seconds and the peak-to-peak amplitude is E volts, it may be readily shown that the duty factor $k$ of the waveform equals the corresponding fraction of the peak-to-peak amplitude which is the amplitude of the negative portion of the signal. Thus, $$(1-k)(E)(kT) = kE(1-k)T \tag{1}$$

The rectified average value of the waveform of FIG. 3 is readily calculated, inasmuch as by definition:

$$E_{ave} = \frac{1}{T}\int_0^T e\, dt \tag{2}$$

Thus, the rectified average value of the waveform is shown by the relation:

$$E_{ave} = \frac{1}{T}[(1-k)(E)kT + kE(1-k)T] \tag{3}$$

$$= 2E(1-k)k \tag{4}$$

Similarly, the rectified root-mean-square value of this waveform may be calculated, inasmuch as by definition:

$$E_{RMS} = \sqrt{\frac{1}{T}\int_0^T e^2\, dt} \tag{5}$$

Thus, the rectified root-mean-square value of the waveform becomes:

$$E_{RMS} = \left\{\frac{1}{T}[(1-k)^2 E^2 kT + k^2 E^2 (1-k)T]\right\}^{1/2} \tag{6}$$

$$= E\sqrt{k(1-k)} \tag{7}$$

By definition, the peak-to-peak value of this waveform is equal to E volts, regardless of the duty factor $k$.

It is desired that the monitoring and measuring apparatus 10 provide a direct current output voltage $E_o$ that is proportional to the logarithm of the root-mean-square value of the input voltage, or $$E_o = m[\log(E\sqrt{k(1-k)})] \tag{8}$$

where $m$ is a proportionality constant. If the logarithm of the waveform of FIG. 3 is obtained by the logarithmic device 14, which obtains the logarithms of the positive and negative excursions of this waveform separately, and the logarithmic device 14 drives the peak-to-peak rectifier 18, then the output voltage $E_o$ of the rectifier 18 appearing across the resistors 73 and 74 will equal:

$$E_o = \log(kE) + \log(1-k)E \tag{9}$$

$$= \log(k)(E^2)(1-k) \tag{10}$$

$$= 2\log[E\sqrt{k(1-k)}] \tag{11}$$

A comparison of Equations 8 and 11 shows that by obtaining the logarithms of the positive and negative excursions of the waveform separately and then obtaining the rectified *peak-to-peak* value of the logarithmic signal, the output voltage is proportional to the logarithm of the *root-mean-square* value of the waveform. It is apparent that the proportionality constant $m$ equals 2, and so the rectified output appearing across the resistor 74, the resistance of which equals that of the resistor 73, equals the logarithm of the root-mean-square value of the signal applied to the logarithmic device for all values of the duty factor $k$, provided that the output of the logarithmic device equals the logarithm of the input thereto. It may be shown that neither an average nor a root-mean-square rectifier will produce this result if the input waveform thereto has been passed through a logarithmic device.

The above analysis was based upon a rectangular wave of varying duty factor. If a sinusoidal wave is measured by a logarithmic device followed by a conventional peak-to-peak rectifier, the output signal would be three decibels greater than the root-mean-square value. Accordingly, the resistor 65 is included in the peak-to-peak rectifier 18 and is selected to be of such value so as to reduce the output signal from the rectifier by exactly three decibels for a sinusoidal as compared to a rectangular waveform. That is, the inclusion of the resistor 65 reduces the output signal from the rectifier by three decibels for a sine-wave signal but has negligible effect on a rectangular waveform. The rectifier output signal is thus proportional to the logarithm of the root-mean-square value of sinusoidal, rectangular or other type waveforms applied to the input terminals 11.

Thus, there has been described measuring and monitoring apparatus including a logarithmic device which produces an output signal the positive and negative excursions of which are proportional to the logarithm of the positive and negative excursions, respectively, of the input signal thereto. The logarithmic device drives a peak-to-peak rectifier having a controlled charge and discharge rate to produce a direct current output voltage that is proportional to the logarithm of the root-mean-square value of he signal being measured, regardless of form, crest or duty factor This output voltage is displayed on a linear meter having a linear scale calibrated in decibels to indicate the signal being measured over a dynamic range of 60 decibels on a single scale, provision being made for adjusting the zero decibel reference setting from +18 to −22 dbm., for example.

While the fundamental novel features of the invention have been shown and described, it will be understood that various substitutions, changes and modifications in the form and details of the apparatus illustrated and its manner of operation may be made by those skilled in the art without departing from the spirit of the invention. For example, it is apparent that a shunt configuration of diode-resistor pairs may be substituted for the series arrangement in the feedback network 16, various amounts of negative feedback being shunted to ground through the corresponding diode-resistor pairs depending upon the instantaneous magnitude of the output signal from the amplifier 15. As the amplifier output signal increases in magnitude, more of the diodes are cut off to provide increased amounts of feedback to the input of the amplifier. Also, it is apparent that the measuring apparatus according to the invention may be used over a frequency range which includes the megacycle region by appropriate selection of components and design of the amplifying stages. It may also be employed to measure direct current signals by using a suitable conventional chopper, for example.

We claim:

1. Apparatus for generating an output signal that is proportional to the logarithm of the root-mean-square value of the input signal thereto comprising means for generating a signal proportional to the logarithm of the input signal including means for generating a signal proprotional to the logarithm of the positive excursions of the input signal and separate means for generating a signal proportional to the logarithm of the negative excursions of the input signal, and means for generating a signal proportional to the peak-to-peak value of the signal generated by the logarithmic signal generating means.

2. Apparatus according to claim 1 wherein the input signal is an alternating current signal, and the peak-to-peak signal generating means includes peak-to-peak rectifying means.

3. Apparatus according to claim 1 wherein the logarithmic signal generating means includes an amplifier, and means to adjust the instantaneous gain of the amplifier in response to the instantaneous magnitude of the output thereof.

4. Apparatus according to claim 1 wherein the logarithmic signal generating means includes an amplifier, and non-linear means for coupling the output of the amplifier to the input thereof.

5. Apparatus for generating an output signal that is proportional to the logarithm of the root-mean-square value of the input signal thereto comprising means for generating a signal proportional to the logarithm of the input signal including an amplifier and non-linear means for coupling the output of the amplifier to the input thereof, the non-linear coupling means including negative feedback means for coupling one of a plurality of portions of the output of the amplifier to the input thereof in response to the instantaneous magnitude of the output thereof, and means for generating a signal proportional to the peak-to-peak value of the signal generated by the logarithmic signal generating means.

6. Apparatus according to claim 5 wherein the negative feedback means includes means for generating a plurality of reference voltage levels, means for comparing the output of the amplifier with the reference voltage levels, and switch means responsive to the comparing means for coupling one of a plurality of portions of the amplifier output to the amplifier input.

7. Apparatus for generating an output signal that is proportional to the logarithm of the input signal thereto comprising an amplifier, and a negative feedback network for coupling one of a plurality of portions of the output signal to the input of the amplifier in response to the instantaneous magnitude of the output signal including means for generating a plurality of reference voltage levels, means for comparing the output signal with the reference voltage levels, and switch means responsive to the comparing means for coupling one of a plurality of portions of the output signal to the amplifier input.

8. Apparatus for measuring signals of a wide dynamic range comprising means for generating a signal proportional to the logarithm of the signal to be measured including means for generating a signal proportional to the logarithm of the positive excursions of the signal to be measured and separate means for generating a signal proportional to the logarithm of the negative excursions of the signal to be measured and means for generating a signal proportional to the peak-to-peak value of the signal generated by the logarthmic signal generating means.

9. Apparatus according to claim 8 including means for indicating the peak-to-peak signal.

10. Apparatus according to claim 9 wherein the indicating means includes an indicating element having a deflection characteristic which is linear with respect to the peak-to-peak signal applied thereto.

11. Apparatus according to claim 9 wherein the signal to be measured is an alternating current signal, and the peak-to-peak signal generating means includes peak-to-peak rectifying means.

12. Apparatus according to claim 11 including means coupled to the peak-to-peak rectifying means for controlling the response of the indicating means to the signal generated by the logarithmic signal generating means.

13. Apparatus according to claim 11 wherein the logarithmic signal generating means includes an amplifier, and non-linear means for coupling the output of the amplifier to the input thereof.

14. Apparatus according to claim 8 adapted to measure signals of both sinusoidal and rectangular waveform and including means for reducing the output signal from the peak-to-peak signal generating means for a sinusoidal waveform by a greater degree than for a rectangular waveform.

15. Apparatus according to claim 14 wherein the degree by which the output signals from the peak-to-peak signal generating means is reduced for a sinusoidal waveform is compared to a rectangular waveform is three decibels.

16. Apparatus for measuring alternating current signals of a wide dynamic range comprising means for generating a signal proportional to the logarithm of the signal to be measured including an amplifier and non-linear means for coupling the output of the amplifier to the input thereof, the non-linear coupling means including first negative feedback means for coupling one of a plurality of portions of the positive excursions of the output signal of the amplifier to the input thereof in response to the instantaneous magnitude of the positive excursions of the amplifier output signal and second negative feedback means for coupling one of a plurality of portions of the negative excursions of the amplifier output signal to the amplifier input in response to the instantaneous magnitude of the negative excursions of the amplifier output signal, means including peak-to-peak rectifying means for generating a signal proportional to the peak-to-peak value of the signal generated by the logarithmic signal generating means, and means for indicating the peak-to-peak signal.

17. Apparatus according to claim 16 wherein the first negative feedback means includes means for generating a plurality of positive reference voltage levels, means for comparing the output of the amplifier with the positive reference voltage levels, and switch means responsive to the positive reference voltage comparing means for coupling one of a plurality of portions of the positive excursions of the amplifier output signal to the amplifier input, and wherin the second negative fedback means includes means for generating a plurality of negative reference voltage levels, means for comparing the output of the amplifier with the negative reference voltage levels, and switch means responsive to the negative reference voltage comparing means for coupling one of a plurality of portions of the negative excursions of the amplifier output signal to the amplifier input.

18. A method of measuring signals having positive and negative excursions comprising the steps of generating a signal proportional to the logarithm of the signal to be measured by obtaining the logarithms of the positive and negative excursions of the last-named signal separately, and generating a signal proportional to the peak-to-peak value of the logarithmic signal.

References Cited

UNITED STATES PATENTS

| 2,486,068 | 10/1949 | Shishini et al. | 324—127 |
| 2,603,779 | 7/1952 | Ferrill. | |
| 2,924,769 | 2/1960 | Harriman et al. | |
| 3,329,836 | 7/1967 | Pearlman et al. | 307—229 |

OTHER REFERENCES

S. Chase, Jr. and F. Schwarz, "Electronics," Dec. 14, 1962, pp. 42–45, article entitled "Mariner II Instrumentation."

ALFRED E. SMITH, Primary Examiner

U.S. Cl. X.R.

328—145